United States Patent
Puno et al.

(10) Patent No.: US 12,059,013 B2
(45) Date of Patent: Aug. 13, 2024

(54) WATER ABSORBERS AND SEPARATION MECHANISMS FOR APPLICATION TO HIGH MOISTURE FOODSTUFFS

(71) Applicant: Conagra Foods RDM, Inc., Chicago, IL (US)

(72) Inventors: Christopher B. Puno, Branchburg, NJ (US); Sharon F. McGuire, Margate City, NJ (US); Amanda R. Schlenker, Mount Laurel, NJ (US)

(73) Assignee: Conagra Foods RDM, Inc., Chicago, IL (US)

( * ) Notice: Subject to any disclaimer, the term of this patent is extended or adjusted under 35 U.S.C. 154(b) by 216 days.

(21) Appl. No.: 15/930,746

(22) Filed: May 13, 2020

(65) Prior Publication Data

US 2020/0359661 A1    Nov. 19, 2020

Related U.S. Application Data

(60) Provisional application No. 62/847,071, filed on May 13, 2019.

(51) Int. Cl.
| | |
|---|---|
| *A23L 3/37* | (2006.01) |
| *A23L 19/00* | (2016.01) |
| *A23L 29/269* | (2016.01) |
| *A23P 20/10* | (2016.01) |
| *A23P 20/18* | (2016.01) |

(52) U.S. Cl.
CPC .............. *A23L 3/37* (2013.01); *A23L 19/03* (2016.08); *A23L 29/27* (2016.08); *A23P 20/105* (2016.08); *A23P 20/18* (2016.08)

(58) Field of Classification Search
None
See application file for complete search history.

(56) References Cited

U.S. PATENT DOCUMENTS

| | | |
|---|---|---|
| 6,120,826 A | 9/2000 | Meyer et al. |
| 6,242,032 B1 | 6/2001 | Meyer et al. |

(Continued)

FOREIGN PATENT DOCUMENTS

| | | |
|---|---|---|
| CN | 108703312 A | 10/2018 |
| WO | 2018159585 A1 | 9/2018 |

OTHER PUBLICATIONS

Notification of Transmittal of the International Search Report and the Written Opinion of the International Searching Authority, or the Declaration dated Aug. 28, 2020 for App. No. PCT/US2020/032607.

*Primary Examiner* — Lien T Tran
(74) *Attorney, Agent, or Firm* — Ryan T. Grace; Advent, LLP

(57) ABSTRACT

A frozen food product is described to include frozen foodstuffs combined with a polysaccharide, protein, or other water absorber, individually or in combination, separated from the food stuff through one or more mechanisms including but not limited to, suspension of the polysaccharide, protein, or other water absorber in oil, encapsulation of the polysaccharide, protein, or other water absorber, or a dry mixture of the polysaccharide, protein, or other water absorber and seasoning applied to frozen foodstuffs. As the frozen foodstuffs are cooked, water expressed from the foodstuffs activates or hydrates the polysaccharide, protein, or other water absorber.

28 Claims, 4 Drawing Sheets

(56) References Cited

U.S. PATENT DOCUMENTS

| | | | |
|---|---|---|---|
| 2010/0151086 A1* | 6/2010 | Salais | A23L 23/00 |
| | | | 426/96 |
| 2013/0183420 A1* | 7/2013 | Shimek | A23B 7/005 |
| | | | 426/326 |
| 2013/0230633 A1* | 9/2013 | Palleschi | A23L 19/03 |
| | | | 426/589 |
| 2015/0140192 A1 | 5/2015 | Irie et al. | |
| 2018/0289049 A1* | 10/2018 | Bandoh | A23L 3/3508 |

* cited by examiner

WATER ABSORBERS AND SEPARATION MECHANISMS FOR APPLICATION TO HIGH MOISTURE FOODSTUFFS

CROSS-REFERENCE TO RELATED APPLICATIONS

The present application claims the benefit under 35 U.S.C. § 119(e) of U.S. Provisional Application Ser. No. 62/847,071, entitled WATER ABSORBERS AND SEPARATION MECHANISMS FOR APPLICATION TO HIGH MOISTURE FOODSTUFFS, filed May 13, 2019. U.S. Provisional Application Ser. No. 62/847,071 is hereby incorporated by reference in its entirety.

BACKGROUND

Frozen foods and associated packaging allow consumers to store foods in a dormant state for later preparation, such as in a microwave, on a stove, or with another heat source. The process of freezing vegetables or other food product can maintain high nutritive value of the food, while providing consumers with convenient preparation options.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to frozen food products incorporating a high moisture content foodstuff in a frozen state and a polysaccharide, protein, or other water absorber, individually or in combination, separated from the food stuff through one or more mechanisms including but not limited to, suspension of the polysaccharide or protein in oil, encapsulation of the polysaccharide or protein, or a dry mixture of the polysaccharide or protein and seasoning applied to frozen foodstuffs. The polysaccharide can include, for example, a hydrocolloid, a starch, a fiber, or the like. The protein can include, for example, a gelatin. As the high moisture content foodstuff is heated, water released during food preparation is introduced to the polysaccharide or protein, where it is absorbed or otherwise causes the polysaccharide or protein to hydrate. The oil suspension keeps the polysaccharide or protein separate from any water present with the frozen food product (e.g., within a frozen sauce chip) until the polysaccharide or protein contacts water released from the high moisture content foodstuff following heating, during storage, during thawing, during freeze/thaw cycles, and the like.

DRAWINGS

The detailed description is described with reference to the accompanying figures.

DETAILED DESCRIPTION

Figure 1:
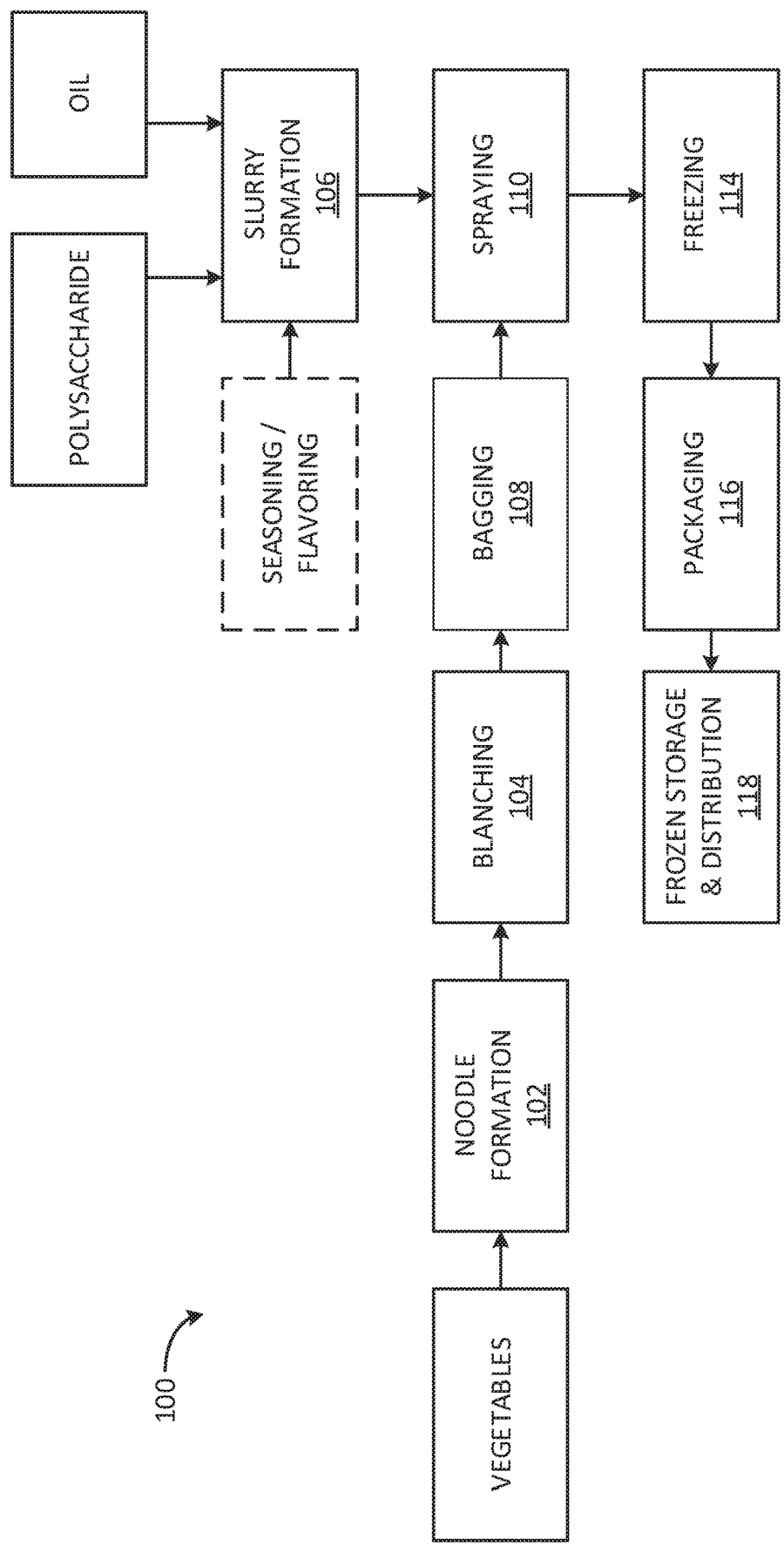
FIG. 1 is a flow diagram illustrating a method for producing a frozen food product in accordance with example implementations of the present disclosure.
Figure 2:
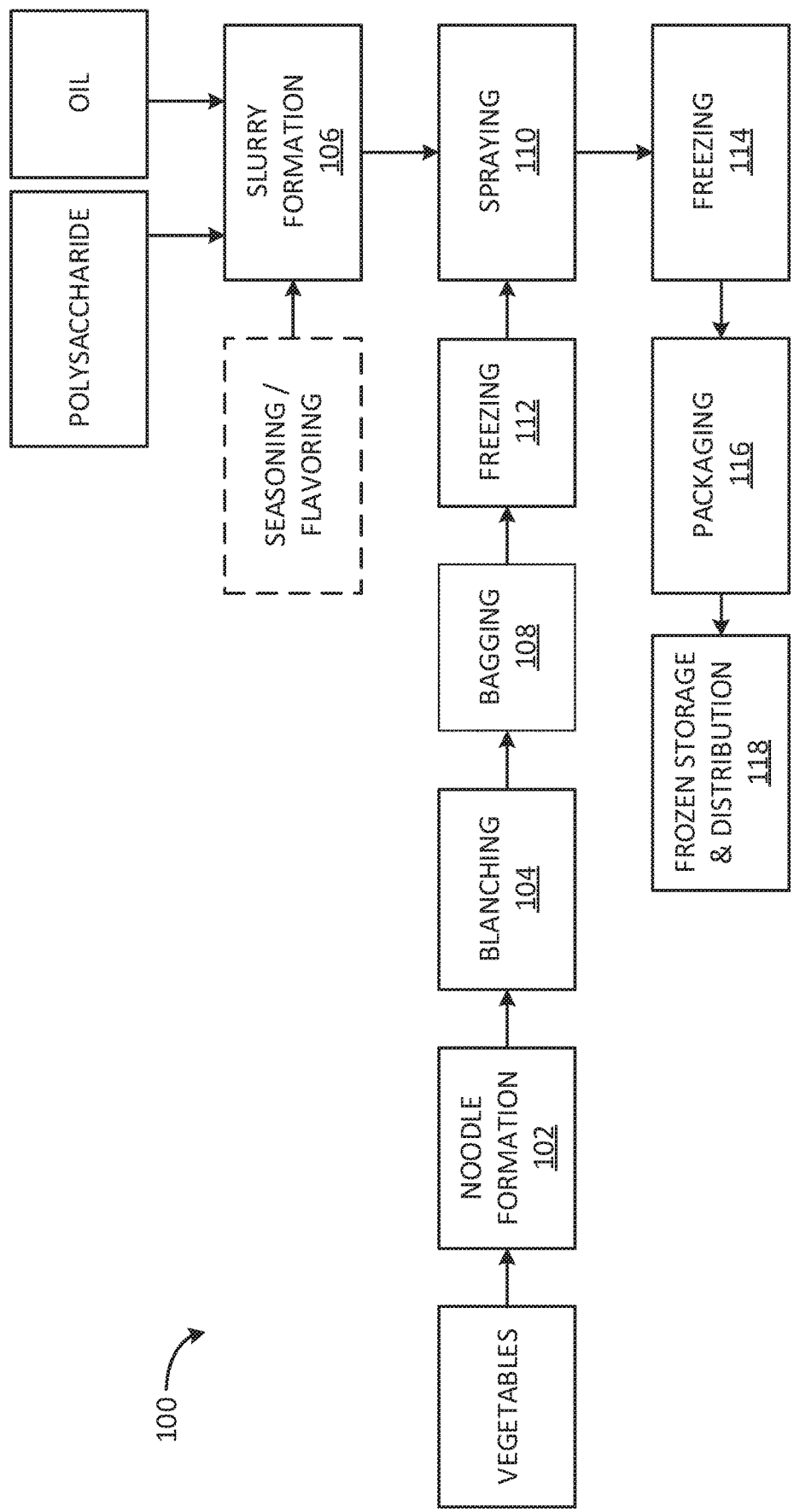
FIG. 2 is a flow diagram illustrating a method for producing a frozen food product in accordance with example implementations of the present disclosure.

Aspects of the disclosure are described more fully hereinafter with reference to any accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as formulations and food products. The following detailed description is, therefore, not to be taken in a limiting sense.

Many consumers enjoy the convenience of packaged frozen foods or meals, which can include vegetables, fruit, and other foodstuffs frozen in a fresh state for later preparation, such as through microwave cooking, stovetop cooking, or the like. For example, zucchini, carrots, butternut squash, broccoli, cauliflower, brussels sprouts, beets, peppers, corn, peas, spinach, onions, lentils, strawberries, blackberries, raspberries, blueberries, bananas, pomegranates, peaches, cherries, pineapple, pears, apples, melons, kiwis, and other foods can be frozen and introduced to freezer packaging, such as steamable bags or trays, for later preparation. Many packaged frozen foods include additional ingredients, such as sauce pellets, proteins, and/or carbohydrates, which can be present in the same package, either included directly with the frozen foods or separated internally, such as through a divider or separate packaging (e.g., pouch).

When cooking frozen foodstuffs, such as in a steamable bag or skillet/pan preparation, water loss from the food and management of this water has been problematic, particularly for high moisture vegetables such as zucchini. Unfortunately, many frozen vegetable products and other frozen food products require consumer involvement in the food preparation dealing with hot liquids following the cooking process. For instance, the preparation instructions on the food packaging can include instructions for the consumer to drain the hot water out of the packaging prior to use or consumption. Many consumers find handling of the hot water and the pooling of water around the vegetables or other foodstuffs dissatisfying or potentially hazardous (e.g., a risk of skin contact with the hot water), which can dissuade future use of similar frozen food products. Without wishing to be bound by theory, a possible mechanism for an ability of a foodstuff to release or retain water following freezing involves the strength of the cell wall and/or membrane during the freezing and/or thawing processes, where fragility of the cell wall and/or membrane during the freezing and/or thawing processes can tend to cause release of water from the foodstuff.

An exemplary frozen food product includes frozen foodstuffs and a polysaccharide, protein, or other water absorber, individually or in combination, separated from the foodstuff through one or more mechanisms including but not limited to, suspension of the polysaccharide in oil, encapsulation of the polysaccharide, or a dry mixture of the polysaccharide and seasoning applied to frozen foodstuffs. In an aspect, the frozen foodstuffs are introduced to packaging with a slurry of polysaccharide, protein, or other water absorber, individually or in combination, with an oil and seasoning introduced to the package prior to a freezing process.

While the disclosure describes examples utilizing polysaccharides, the disclosure is not limited to polysaccharides and can include any suitable edible ingredient to absorb, bind, or otherwise remove water from leeching into the frozen food product packaging, including but not limited to proteins (e.g., gelatin) and other water absorbers, individually or in combination. The polysaccharide separation mechanism keeps the polysaccharide separate from any water present with the frozen foodstuffs or additives thereto until the polysaccharide contacts water released from the foodstuff during storage, during or following heating, during freeze/thaw cycles, and the like. Example additives include seasonings, oils in addition to the oil for suspension of the polysaccharide, and other additives. Example formulations of the frozen food product includes frozen sauce in addition to the frozen foodstuffs and the polysaccharide with the polysaccharide separation mechanism. The frozen foodstuff can include, but is not limited to, vegetables, fruits, meats or other proteins, carbohydrates, and combinations thereof.

Vegetables

The vegetables to be frozen for inclusion in the frozen food product can include any plant or portion thereof cultivated for an edible part. For example, the vegetables can include, but are not limited to, zucchini, carrots, butternut squash, broccoli, cauliflower, brussels sprouts, beets, peppers, corn, peas, spinach, onions, lentils, and combinations or mixes thereof. The vegetables can be included raw or cooked in the frozen food product. For example, the vegetables can be steam blanched following a washing and trimming procedure. In one aspect, the vegetables are shaped or otherwise formed for inclusion in the frozen food product. For example, the vegetables can be formed into an elongated noodle shape (e.g., a spiral-shaped noodle) through extrusion, cutting, or other forming process. In one aspect, the vegetables are formed in a spiral-shaped noodle and subsequently steam blanched prior to freezing. In one aspect, the vegetables have a water content at or above about 85% by weight.

In one aspect, the frozen food product can include vegetables in a weight percentage of total content from about 70% to about 99%. As used herein, the total content of the frozen food product excludes any packaging weight. For example, the frozen food product can include vegetables in a weight percentage of total content from about 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99% to about 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99%. In one aspect, the frozen food product includes vegetables in a weight percentage of total content from about 93% to about 99%. In another aspect, the frozen food product includes vegetables in a weight percentage of total content from about 73% to about 83%, such as when the frozen food product includes a sauce in combination with the edible water absorber in an encapsulated or otherwise suspended state (e.g., in oil).

In one aspect, the frozen food product can include zucchini formed in noodle shapes with a weight percentage of total content from about 70% to about 99%. For example, frozen food product can include zucchini formed in noodle shapes with a weight percentage of total content from about 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99% to about 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99%. In one aspect, the frozen food product includes zucchini formed in noodle shapes in a weight percentage of total content from about 93% to about 99%. In another aspect, the frozen food product includes zucchini formed in noodle shapes in a weight percentage of total content from about 73% to about 83%, such as when the frozen food product includes a sauce in combination with the edible water absorber in an encapsulated or otherwise suspended state (e.g., in oil).

Fruit

The fruits to be frozen for inclusion in the frozen food product can include culinarily-recognized edible fruits. For example, the fruits can include, but are not limited to, strawberries, blackberries, raspberries, blueberries, bananas, pomegranates, peaches, cherries, pineapple, pears, apples, melons, kiwis, and combinations or mixes thereof. The fruits can be included raw or cooked in the frozen food product. In one aspect, the fruits are shaped or otherwise formed for inclusion in the frozen food product. For example, the fruits can be sliced, diced, shaved, or otherwise formed for introduction to the frozen food product.

In one aspect, the frozen food product can include fruit in a weight percentage of total content from about 83% to about 99%. For example, the frozen food product can include fruit in a weight percentage of total content from about 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99% to about 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99%.

Slurry

The frozen food product can include the vegetables, fruit, protein, or other high water content-containing foodstuff in a package in combination with a slurry containing other ingredients. The slurry can include, but is not limited to, an edible water absorber (e.g., a polysaccharide, protein, or other water absorber, individually or in combination), an oil, seasoning, and combinations thereof. The slurry can be introduced to the foodstuff with the foodstuff in a frozen state or with the foodstuff in an unfrozen state wherein the combined slurry and foodstuff is subsequently frozen. As used herein, the term "frozen state" refers to the state of foodstuffs having been subjected to chilled temperatures for a duration sufficient to preserve the foodstuff from spoilage by freezing water contained therein and can include, for example, foodstuffs having a temperature below about 0° F.

In one aspect, the frozen food product can include the slurry in a weight percentage of total content from about 1% to about 17%. For example, the frozen food product can include slurry in a weight percentage of total content from about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, and 17% to about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, and 17%. In an aspect, the frozen food product includes slurry in a weight percentage of total content from about 1% to about 4%. The slurry includes the edible water absorber in an encapsulated or otherwise suspended state (e.g., in oil) to separate the water absorber from any water present with the frozen foodstuffs or additives thereto until the water is released from the foodstuff during storage, during or following heating, during freeze/thaw cycles, and the like, where the water is absorbed by or otherwise bound to the water absorber.

Polysaccharide

The polysaccharide for inclusion in the frozen food product includes structures that hydrate or activate upon introduction to water. In one aspect, most of the water of the frozen food product to hydrate or activate the polysaccharide originates from the vegetables, fruits, and/or meats, however other sources of water can be included with the frozen food product, such as included sauces or flavor additives. The polysaccharide can include, but is not limited to, xanthan gum, locust bean gum, starch (e.g., modified starch, unmodified starch), cellulose gum, guar, acacia, fiber, gellan, carrageenan, hydrocolloids, and combinations thereof. The polysaccharide is introduced to the frozen food product in a dehydrated or inactivated state to permit the polysaccharide to be available for hydration or absorption of the water released from the frozen foodstuffs during or following heating.

In one aspect, the frozen food product includes the polysaccharide in a weight percentage of total content from about 0.08% to about 0.22%. For example, the frozen food product can include the polysaccharide in a weight percentage of total content from about 0.08%, 0.09%, 0.10%, 0.11%, 0.12%, 0.13%, 0.14%, 0.15%, 0.16%, 0.17%, 0.18%, 0.19%, 0.20%, 0.21%, and 0.22% to about 0.08%, 0.09%, 0.10%, 0.11%, 0.12%, 0.13%, 0.14%, 0.15%, 0.16%, 0.17%, 0.18%, 0.19%, 0.20%, 0.21%, and 0.22%. In one aspect, the frozen food product includes the polysaccharide in a weight percentage of total content from about 0.10% to about 0.20%. In one aspect, the frozen food product includes the polysaccharide in a weight percentage of the slurry content from about 2% to about 4%. For example, the frozen food product can include the polysaccharide in a weight percentage of the slurry content from about 2%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% to about 2%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0%. In one aspect, the frozen food product includes the polysaccharide in a weight percentage of the slurry content from about 2.5% to about 3.5%.

In one aspect, the frozen food product includes the polysaccharide in a weight percentage of the slurry content from about 4.5% to about 8.5%, such as when the frozen food product includes a sauce in addition to the slurry and vegetables. In another aspect, the frozen food product includes the polysaccharide in a weight percentage of the slurry content from about 5.5% to about 7.5%, when the frozen food product includes a sauce in addition to the slurry and vegetables For example, the frozen food product can include the polysaccharide in a weight percentage of the slurry content from about 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, and 7.5% to about 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, and 7.5%. In one aspect, the frozen food product includes xanthan gum in a weight percentage of the slurry content from about 5.5% to about 8.5%.

In one aspect, the frozen food product includes xanthan gum in a weight percentage of total content from about 0.08% to about 0.22%. For example, the frozen food product can include xanthan gum in a weight percentage of total content from about 0.08%, 0.09%, 0.10%, 0.11%, 0.12%, 0.13%, 0.14%, 0.15%, 0.16%, 0.17%, 0.18%, 0.19%, 0.20%, 0.21%, and 0.22% to about 0.08%, 0.09%, 0.10%, 0.11%, 0.12%, 0.13%, 0.14%, 0.15%, 0.16%, 0.17%, 0.18%, 0.19%, 0.20%, 0.21%, and 0.22%. In one aspect, the frozen food product includes xanthan gum in a weight percentage of total content from about 0.10% to about 0.20%. In one aspect, the frozen food product includes xanthan gum in a weight percentage of the slurry content from about 2% to about 4%. For example, the frozen food product can include xanthan gum in a weight percentage of the slurry content from about 2%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% to about 2%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0%.%. In one aspect, the frozen food product includes xanthan gum in a weight percentage of the slurry content from about 2.5% to about 3.5%.

Oil

Oil can be combined with the polysaccharide to suspend the polysaccharide within the oil and keep the polysaccharide in a dehydrated or inactivated state until release of water from the frozen foodstuff, such as during freeze/thaw cycles, heating of the frozen food product, or the like. The oil can include, but is not limited to, olive oil, soybean oil, sunflower oil, canola oil, corn oil, and combinations thereof. In one aspect, the oil suspends the polysaccharides to form an oil suspension having a viscosity that is substantially similar to the viscosity of the oil alone, which can permit traditional oil handling systems, such as pumps, sprays nozzles, and the like, to handle the oil suspension without substantial structural modification or process alteration.

In one aspect, the frozen food product includes an oil in a weight percentage of total content from about 1% to about 3%. For example, the frozen food product can include oil in a weight percentage of total content from about 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, and 3.0% to about 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, and 3.0%. In one aspect, the frozen food product includes oil in a weight percentage of total content from about 1% to about 1.8%. In another aspect, the frozen food product includes oil in a weight percentage of total content from about 1.6% to about 2.7%, such as when the frozen food product includes a sauce in addition to the slurry and the vegetables.

In one aspect, the frozen food product includes oil in a weight percentage of the slurry content from about 50% to about 70%. For example, the frozen food product can include oil in a weight percentage of the slurry content from about 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, and 70% to about 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, and 70%. In one aspect, the frozen food product includes oil in a weight percentage of the slurry content from about 56% to about 64%.

In one aspect, the frozen food product includes olive oil in a weight percentage of total content from about 1% to about 2.5%. For example, the frozen food product can include olive oil in a weight percentage of total content from about 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, and 2.5% to about 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, and 2.5%. In one aspect, the frozen food product includes olive oil in a weight percentage of total content from about 1% to about 1.8%. In one aspect, the frozen food product includes olive oil in a weight percentage of the slurry content from about 50% to about 70%. For example, the frozen food product can include olive oil in a weight percentage of the slurry content from about 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, and 70% to about 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, and 70%. In one aspect, the frozen food product includes olive oil in a weight percentage of the slurry content from about 56% to about 64%.

Fats

Fats can be incorporated within the frozen food product to encapsulate the polysaccharide and keep the polysaccharide in a dehydrated or inactivated state until release of water from the frozen foodstuff, such as during freeze/thaw cycles, heating of the frozen food product, or the like. The fats can include, but are not limited to, saturated fats, unsaturated fats, polyunsaturated fats, and combinations thereof, that can harden, solidify or partially solidify at ambient or freezing environments. In one aspect, the fat-encapsulated polysaccharides are introduced to the foodstuff while the foodstuff is in a frozen state. Alternatively or additionally, the fat-encapsulated polysaccharides can be introduced to the foodstuff while the foodstuff is in a non-frozen state.

Optional Additives

The frozen food product can include one or more additives. The additives can be portions of a frozen meal or portion of a frozen food product. For example, the additives include seasoning or flavor additives including, but not limited to, salt, pepper, onion, starches, garlic, oregano, oil, butter, water, and combinations thereof. Other additives can include, but are not limited to, protein additives or meat, carbohydrates, dairy products, or combinations thereof. Other additives can include, but are not limited to, frozen sauce pellets. The sauce pellets can be frozen pieces of a sauce having a water base, an oil base, a vegetable base, a fruit base, a dairy base, a meat base, or combinations thereof, with additional seasonings or flavorings. In one aspect, the sauce pellets are concentrated (e.g., having a reduced water content), as a significant amount of water is generally released from the frozen foodstuffs during cooking. In one non-limiting example, the concentrated sauce pellets have a water content reduction of 50% (e.g., a reduction from 20% water by weight to 10% water by weight) as compared to unconcentrated sauce pellets included in traditional frozen food products. The water from the frozen foodstuffs will hydrate or activate the separated polysaccharide, which can be combined with the sauce as the sauce pellets thaw during cooking to form a diluted sauce as compared to the initial concentrated frozen sauce pellets.

In one aspect, the frozen food product includes salt in a weight percentage of total content from about 0.5% to about 0.9%. For example, the frozen food product can include salt in a weight percentage of total content from about 0.5%, 0.55%, 0.6%, 0.65%, 0.7%, 0.75%, 0.8%, 0.85%, and 0.9% to about 0.5%, 0.55%, 0.6%, 0.65%, 0.7%, 0.75%, 0.8%, 0.85%, and 0.9%. The salt can include various types (e.g., sea salt, kosher salt, rock salt, and the like) and sizes (e.g., finely ground salt, flour-cut salt, pulverized salt, and the like) of salts. In one aspect, the frozen food product includes salt in a weight percentage of the slurry content from about 25% to about 35%. For example, the frozen food product can include salt in a weight percentage of the slurry content from about 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35% to about 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35%.

In one aspect, the frozen food product includes pepper in a weight percentage of total content from about 0.03% to about 0.11%. For example, the frozen food product can include pepper in a weight percentage of total content from about 0.03%, 0.04%, 0.05%, 0.06%, 0.07%, 0.08%, 0.09%, 0.10%, and 0.11% to about 0.03%, 0.04%, 0.05%, 0.06%, 0.07%, 0.08%, 0.09%, 0.10%, and 0.11%. The pepper can include, but is not limited to, ground black peppercorn. In one aspect, the frozen food product includes pepper in a weight percentage of the slurry content from about 5.5% to about 7.5%. For example, the frozen food product can include salt in a weight percentage of the slurry content from about 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, and 7.5% to about 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, and 7.5%.

In one aspect, the frozen food product includes a sauce in combination with the vegetables and the slurry (e.g., containing the oil and the edible water absorber, such as a polysaccharide). For example, the frozen food product can include the sauce in a weight percentage of total content from about 10% to about 30%. In one aspect, the frozen food product includes sauce in a weight percentage of total content from about 10% to about 30%, vegetables in a weight percentage of total content from about 68% to about 88%, and slurry in a weight percentage of total content from about 1% to about 4%. For example, the frozen food product can include sauce in a weight percentage of total content from about 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, and 30% to about 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, and 30%. The sauce can include, but is not limited to, a vegetable base (e.g., tomato), onion, water, a starch, and one or more seasonings. In an aspect, the sauce is a concentrated sauce having a water content by weight of the sauce from about 8.5% to about 12.5%. For example, the sauce can be a concentrated sauce having a water content by weight of the sauce from about 8.5%, 9%, 9.5, 10%, 10.5%, 11%, 11.5%, 12%, and 12.5% to about 8.5%, 9%, 9.5, 10%, 10.5%, 11%, 11.5%, 12%, and 12.5%. During the heating process of the frozen food product, a first portion of the water expressed by the frozen vegetables will hydrate or activate the polysaccharide suspended in the oil of the slurry and a second portion of the water expressed by the frozen vegetables will combine with the sauce to provide an unconcentrated sauce.

Example Frozen Food Product Assembly

Referring to FIGS. 1-4, a process 100 for producing an example frozen food product is shown. The process 100 includes forming noodles from a vegetable feed stream to provide vegetable noodles in operation 102. For example, a batch of washed and trimmed vegetables (e.g., zucchini) is introduced to a spiralized cutter to provide spiralized zucchini noodles. The vegetable noodles are then blanched in operation 104 to prepare the vegetable noodles for subsequent freezing and frozen storage.

The process 100 also includes preparing a slurry for introduction to the blanched vegetable noodles in operation 106. The slurry includes a polysaccharide in a suspended state within oil to maintain the polysaccharide in a dehydrated or inactivated state within the packaging of the frozen food product until release of water from the frozen foodstuff during cooking, thawing, or the like. The operation 106 includes introducing the polysaccharide (e.g., xanthan gum) and the oil (e.g., olive oil) to a mixing vessel (e.g., a blending tank) and agitating the mixture to suspend the polysaccharide within the oil. In an aspect, the blender tank continuously mixes the slurry to facilitate suspension of the polysaccharide within the oil. In an aspect, the operation 106 optionally includes blending seasonings, flavorings, other ingredients, or combinations thereof to form the slurry. For example, salt and pepper can be introduced to the blender to combine the seasonings with the suspended polysaccharide. In some aspects, seasoning or flavoring can be added to the oil suspension prior to introduction to the vegetable noodles. In other aspects, the seasoning or flavoring is blended and introduced to the vegetable noodles before, during, after the oil suspension is introduced to the vegetable noodles, or combinations thereof.

Figure 3:
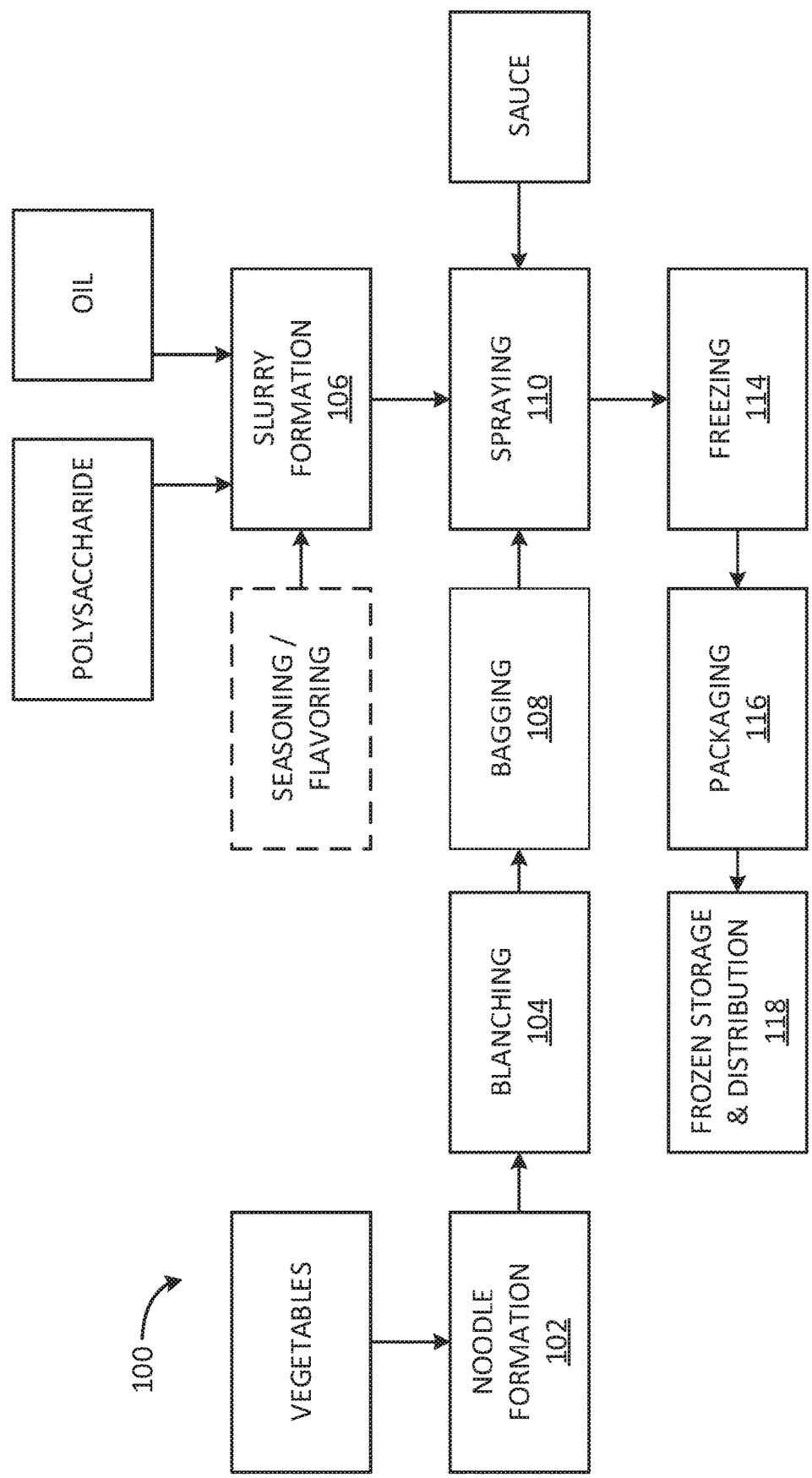
FIG. 3 is a flow diagram illustrating a method for producing a frozen food product having a sauce component in accordance with example implementations of the present disclosure.
Figure 4:
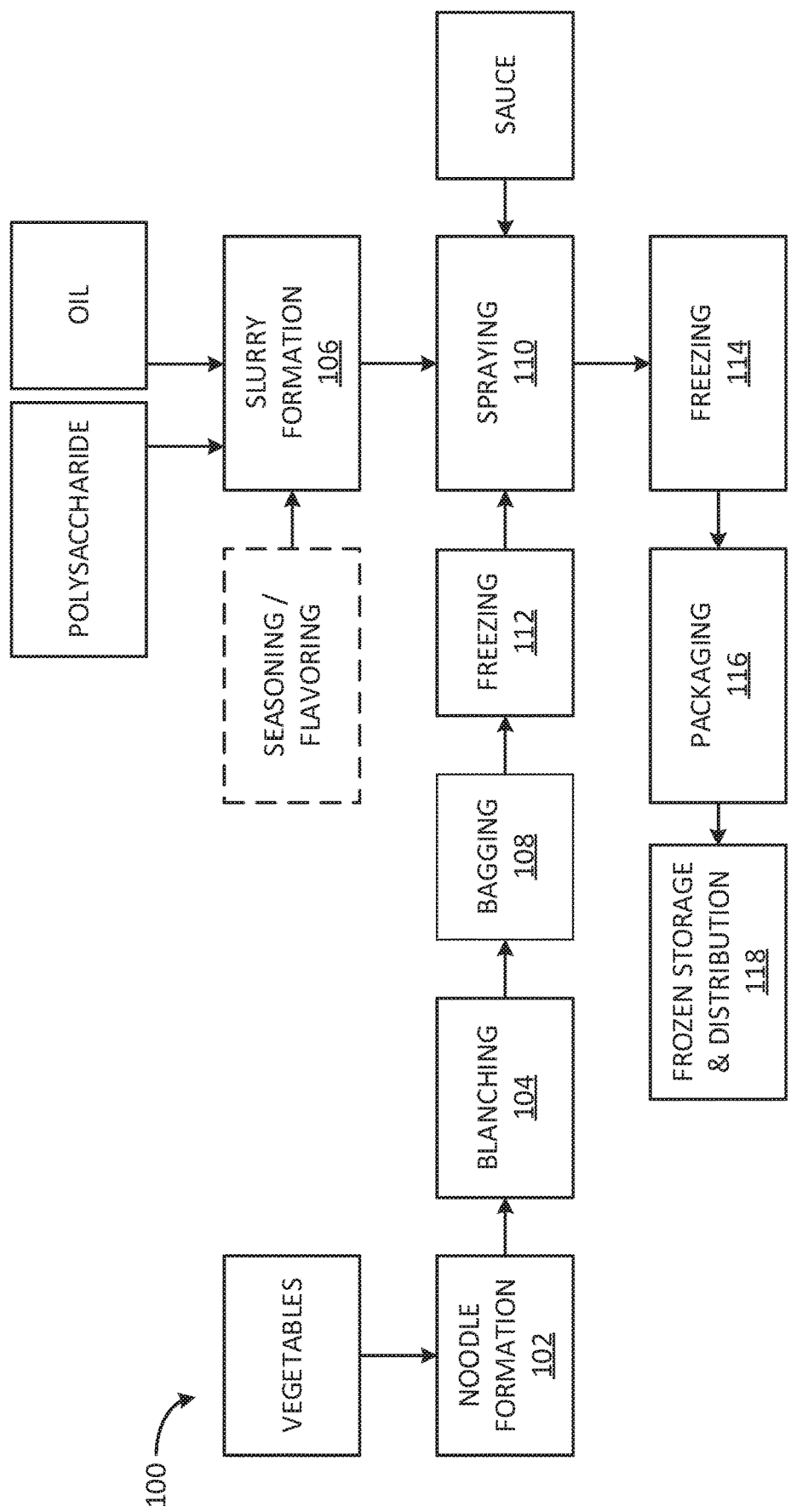
FIG. 4 is a flow diagram illustrating a method for producing a frozen food product having a sauce component in accordance with example implementations of the present disclosure.

The process 100 also includes introducing the vegetable noodles to a container in operation 108. For example, the vegetable noodles can be introduced to a bag suitable for frozen storage, such as a polymer-based sealable bag (e.g., a heat-sealable bag). The process 100 further includes spraying the slurry onto the blanched vegetable noodles in operation 110. In an aspect, the slurry is directed through a direction injection spray nozzle to control the amount of slurry introduced to the blanched vegetable noodles. The spraying can occur by directing the spray into the interior of the bag onto the noodles, or prior to introduction of the noodles into the bag. In the process 100 shown in FIG. 1, the slurry is sprayed or otherwise introduced to the blanched vegetable noodles in an unfrozen state. In the process 100 shown in FIG. 2, the slurry is sprayed or otherwise introduced to the blanched vegetable noodles in a frozen state following a freezing step (e.g., operation 112) to freeze the blanched vegetable noodles. In an aspect, examples of which are shown in FIGS. 3 and 4, the operation 110 also includes introducing a sauce component to the blanched vegetable noodles in addition to the slurry introduction. The spraying can occur by directing the spray into the interior of the bag onto the noodles, or prior to introduction of the noodles into the bag. In the process 100 shown in FIG. 3, the sauce is sprayed or otherwise introduced to the blanched vegetable noodles in an unfrozen state. In the process 100 shown in FIG. 4, the sauce is sprayed or otherwise introduced to the blanched vegetable noodles in a frozen state following a freezing step (e.g., operation 112) to freeze the blanched vegetable noodles. The sprayed noodles are then frozen (or refrozen in FIGS. 2 and 4) in operation 114 to maintain separation of water from the blanched vegetable noodles and the dehydrated/inactivated polysaccharide suspended within the oil until the frozen food product is prepared by the consumer or substantial thawing/cooking is otherwise permitted.

The process 100 can also include introducing the vegetable noodles into packaging in operation 116. For example, the bags can be introduced to additional structured packaging in for display within frozen display cases or the like. Bulk packages can then be transferred for frozen storage and distribution in operation 118.

In another example frozen food product, vegetables are formed into an elongated noodle shape through introduction to an extruder, slicer, or other device. The vegetable noodles can be cooled or frozen prior to introduction of additional ingredients or prior to packaging. An encapsulated polysaccharide is made by encapsulating the polysaccharide in a hardened fat and introduced to the vegetable noodles with the vegetables in a frozen or unfrozen state. In some aspects, seasoning or flavoring can be added to the encapsulated polysaccharide prior to introduction to the vegetable noodles. In other aspects, the seasoning or flavoring is blended and introduced to the vegetable noodles before, during, or after the encapsulated polysaccharide is introduced to the vegetable noodles.

In another example frozen food product, vegetables are formed into an elongated noodle shape through introduction to an extruder, slicer, or other device. The vegetable noodles can be cooled or frozen prior to introduction of additional ingredients or prior to packaging. A dry mixture of the polysaccharide and seasoning (e.g., salt, pepper, garlic, etc.) is introduced to the vegetable noodles with the vegetables in a frozen state to separate the water (e.g., in a solid state) from the polysaccharide. In some aspects, additional seasoning or flavoring is blended and introduced to the vegetable noodles before, during, or after the dry mixture is introduced to the vegetable noodles.

Following freezing, the polysaccharides are in dehydrated or inactivated state (e.g., in the oil suspension, encapsulated by the hardened fat, or separated from the foodstuffs by the frozen state of the foodstuffs), so the initial exposure to water is during cooking of the frozen vegetables when the vegetables express excess water. The expressed water is made available to the polysaccharides within the food packaging. Once exposed to water, the polysaccharides imbibe the expressed water and ultimately form a thickened solution. If the frozen food product includes a sauce chip, the thickened solution mixes with the sauce as the sauce chip melts and forms a finished sauce.

Example Development Research

Without separation of the frozen foodstuffs from the polysaccharide, the food packaging would include a pool of expressed water, independent of any sauce present. For instance, research was conducted regarding frozen vegetables and reduced water content frozen sauce pellets, without the oil suspension described herein. However, making a concentrated, thick sauce to utilize water expressed by cooking frozen vegetables was challenging due to attempting a frozen sauce pellet with little water and high salt content. Additionally, research was conducted regarding frozen vegetables with added starches, gums, and fibers to frozen sauce chips, however it was discovered that the hydrocolloids activated with the water within the sauce formulation or hydrated as the sauce cooked. When the vegetables released the water during cooking, the hydrocolloids present were either fully activated or could not absorb the excess water.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A frozen food product, the frozen food product comprising:
a vegetable formed into an elongated noodle shape in an amount from about 70% to about 99% by weight of the frozen food product, the vegetable being in a frozen state; and
a slurry including a polysaccharide suspended in an oil and applied to the vegetable, the slurry present in an amount from about 1% to about 17% by weight of the frozen food product, the polysaccharide in at least one of a dehydrated state or an inactivated state in the oil, the polysaccharide included in an amount from about 0.08% to about 0.22% by weight of the frozen food product, the oil present in an amount from about 1% to about 2.5% by weight of the frozen food product to physically separate the polysaccharide from water contained by the vegetable in the frozen state, wherein the polysaccharide contacts water expressed from the vegetable during thawing of the vegetable, and wherein the water is at least one of bound by or adhered to the polysaccharide when the vegetable is in an unfrozen state.

2. The frozen food product of claim 1, wherein the vegetable has a water content of at least 85% by weight.

3. The frozen food product of claim 1, wherein the vegetable includes zucchini.

4. The frozen food product of claim 3, wherein the zucchini is in an amount from about 93% to about 99% by weight of the frozen food product.

5. The frozen food product of claim 1, wherein the polysaccharide includes xanthan gum.

6. The frozen food product of claim 1, further including seasoning.

7. The frozen food product of claim 6, wherein the seasoning includes salt in an amount from about 0.5% to about 0.9% by weight of the frozen food product and pepper in an amount from about 0.03% to about 0.11% by weight of the frozen food product.

8. The frozen food product of claim 1, wherein the polysaccharide is included in an amount from about 0.1% to about 0.2% by weight of the frozen food product, and wherein the oil is included in an amount from about 1% to about 1.8% by weight of the frozen food product.

9. The frozen food product of claim 1, further including a sauce in an amount from about 10% to about 30% by weight of the frozen food product.

10. The frozen food product of claim 9, wherein the sauce includes a water content from about 8.5% to about 12.5% by weight of the sauce.

11. The frozen food product of claim 10, wherein the vegetables are included in an amount from about 68% to about 88% by weight of the frozen food product, the slurry included in an amount from about 1% to about 4% by weight of the frozen food product.

12. A pre-packaged frozen food product, the frozen food product comprising:
a vegetable formed into an elongated noodle shape in an amount from about 70% to about 99% by weight of the frozen food product, the vegetable being in a frozen state;
a slurry including a water absorber suspended in an oil, the slurry present in an amount from about 1% to about 17% by weight of the frozen food product, wherein the water absorber includes a polysaccharide suspended in the oil in at least one of a dehydrated state or an inactivated state in the oil, the polysaccharide included in an amount from about 2% to about 4% by weight of the slurry, the oil present in an amount from about 50% to about 70% by weight of the slurry to physically separate the polysaccharide from water contained by the vegetable in the frozen state, wherein the polysaccharide contacts water expressed from the vegetable during thawing of the vegetable, and wherein the water is at least one of bound by or adhered to the polysaccharide when the vegetable is in an unfrozen state; and
a sealed package containing the vegetable and the slurry.

13. The pre-packaged frozen food product of claim 12, wherein the vegetable has a water content of at least 85% by weight.

14. The pre-packaged frozen food product of claim 12, wherein the vegetable includes zucchini.

15. The pre-packaged frozen food product of claim 14, wherein the zucchini is in an amount from about 93% to about 99% by weight of the frozen food product.

16. The pre-packaged frozen food product of claim 12, wherein the polysaccharide includes xanthan gum.

17. The pre-packaged frozen food product of claim 12, wherein the slurry further includes seasoning.

18. The pre-packaged frozen food product of claim 17, wherein the seasoning includes salt in an amount from about 25% to about 35% by weight of the slurry and pepper in an amount from about 5.5% to about 7.5% by weight of the slurry.

19. The pre-packaged frozen food product of claim 12, wherein the polysaccharide includes xanthan gum in an amount from about 2.5% to about 3.5% by weight of the slurry, and wherein the oil is included in an amount from about 56% to about 64% by weight of the slurry.

20. A pre-packaged frozen food product, the frozen food product comprising:
   a vegetable formed into an elongated noodle shape in an amount from about 70% to, the vegetable being in a frozen state;
   a polysaccharide a slurry including suspended in an oil in at least one of a dehydrated state or an inactivated state in the oil the slurry present in an amount from about 1% to about 17% by weight of the frozen food product, the oil physically separating the polysaccharide from water contained by the vegetable in the frozen state, wherein the polysaccharide contacts water expressed from the vegetable during thawing of the vegetable, and wherein the water is at least one of bound by or adhered to the polysaccharide when the vegetable is in an unfrozen state; and
   a sealed package containing the vegetable and the polysaccharide suspended in the oil.

21. The pre-packaged frozen food product of claim 20, wherein the vegetable has a water content of at least 85% by weight.

22. A method of preparing a frozen food product, comprising:
   forming a vegetable having a water content of at least 85% by weight into elongated noodles;
   introducing a polysaccharide and an oil to a mixing vessel;
   mixing the polysaccharide and the oil prior to introduction to the elongated noodles to form a slurry having the polysaccharide suspended in the oil in at least one of a dehydrated state or an inactivated state in the oil;
   introducing the elongated noodles to an interior of a sealable package;
   spraying the slurry onto the elongated noodles within the interior of the sealable package; and
   freezing the slurry-sprayed elongated noodles, wherein the oil physically separates the polysaccharide from water contained by the elongated noodles in the frozen state, wherein the polysaccharide contacts water expressed from the vegetable during thawing of the vegetable, and wherein the water is at least one of bound by or adhered to the polysaccharide when the vegetable is in an unfrozen state, wherein the elongated noodles are included in an amount from about 68 to about 99% by weight of the frozen food product, and wherein the slurry is included in an amount from about 1% to about 17% by weight of the frozen food product.

23. The method of claim 22, further comprising:
   introducing seasoning to the mixing vessel, wherein the slurry includes the polysaccharide, the oil, and the seasoning.

24. The method of claim 23, wherein the seasoning includes salt in an amount from about 25% to about 35% by weight of the slurry and pepper in an amount from about 5.5% to about 7.5% by weight of the slurry.

25. The method of claim 22, wherein the polysaccharide includes xanthan gum in an amount from about 2.5% to about 3.5% by weight of the slurry, and wherein the oil is included in an amount from about 56% to about 64% by weight of the slurry.

26. The method of claim 22, further comprising:
   introducing a sauce onto the elongated noodles within the interior of the sealable package, wherein the sauce is included in an amount from about 10% to about 30% by weight of the frozen food product.

27. The method of claim 26, wherein the sauce includes a water content from about 8.5% to about 12.5% by weight of the sauce.

28. The method of claim 27, wherein the elongated noodles are included in an amount from about 68% to about 88% by weight of the frozen food product, and wherein the slurry is included in an amount from about 1% to about 4% by weight of the frozen food product.

\* \* \* \* \*